US008117199B2

(12) United States Patent
Ghani et al.

(10) Patent No.: US 8,117,199 B2
(45) Date of Patent: Feb. 14, 2012

(54) DETERMINATION OF A PROFILE OF AN ENTITY BASED ON PRODUCT DESCRIPTIONS

(75) Inventors: Rayid Ghani, Evanston, IL (US); Andrew E. Fano, Lincolnshire, IL (US)

(73) Assignee: Accenture Global Services Limited, Dublin (IE)

( * ) Notice: Subject to any disclaimer, the term of this patent is extended or adjusted under 35 U.S.C. 154(b) by 0 days.

(21) Appl. No.: 12/710,832

(22) Filed: Feb. 23, 2010

(65) Prior Publication Data
US 2010/0153187 A1    Jun. 17, 2010

Related U.S. Application Data

(62) Division of application No. 10/119,665, filed on Apr. 10, 2002, now abandoned.

(51) Int. Cl.
*G06F 7/00* (2006.01)
*G06F 17/30* (2006.01)
*G06F 17/00* (2006.01)

(52) U.S. Cl. ....... 707/734; 707/749; 707/944; 705/7.33; 705/26.7

(58) Field of Classification Search .................. 707/734, 707/749, 944; 705/7.33, 26.7
See application file for complete search history.

(56) References Cited

U.S. PATENT DOCUMENTS

| 5,146,406 | A  |   | 9/1992  | Jensen |
|-----------|----|---|---------|--------|
| 5,943,670 | A  |   | 8/1999  | Prager |
| 6,405,175 | B1 |   | 6/2002  | Ng |
| 6,668,254 | B2 |   | 12/2003 | Matson et al. |
| 6,714,939 | B2 |   | 3/2004  | Saldanha et al. |
| 6,785,671 | B1 | * | 8/2004  | Bailey et al. ........................ 1/1 |
| 6,804,659 | B1 | * | 10/2004 | Graham et al. ............ 705/14.49 |
| 6,986,104 | B2 |   | 1/2006  | Green |
| 7,020,662 | B2 |   | 3/2006  | Boreham et al. |
| 7,043,420 | B2 |   | 5/2006  | Ratnaparkhi |
| 7,043,492 | B1 |   | 5/2006  | Neal et al. |
| 7,567,976 | B1 |   | 7/2009  | Betz et al. |
| 2002/0111863 | A1 | * | 8/2002  | Landesmann .................. 705/14 |
| 2002/0133479 | A1 |   | 9/2002  | Dippold |
| 2002/0142277 | A1 |   | 10/2002 | Burstein et al. |

OTHER PUBLICATIONS

Agrawal, et al., "On Integrating Catalogs", ACM, May 2001.
Ghani, et al., "Building Recommender Systems using a Knowledge of Base of Product Semantics", 10 pages.
Joachims, "A Probabilistic Analysis of the Rocchio Algorithm with TFIDF for Text Categorization", Carnegie Mellon University, Mar., 1996.
A.P. Dempster, et al., "Maximum Likelihood from Incomplete Data via the EM Algorithm", Journal of the Royal Statistical Scoiety, Series B, 39(1):1-38, 1977.

(Continued)

*Primary Examiner* — Jacob F Betit
(74) *Attorney, Agent, or Firm* — Vedder Price PC

(57) ABSTRACT

Relative to a given product or products, one or more attributes and, for each attribute, a plurality of possible attribute values, are defined. For a given product and attribute, one or more descriptions of the product are obtained and analyzed to determine the correspondence of the description(s), and hence the product itself, to each of the plurality of possible attribute values. In one embodiment, this analysis is based on previously-labeled training data. A knowledge base can be populated with information identifying the products and their correspondence to the plurality of possible attribute values for each attribute. This technique may be used to develop a profile of an entity, which in turn may be used to develop appropriate marketing messages or recommendations for other products.

20 Claims, 4 Drawing Sheets

OTHER PUBLICATIONS

R. Agrawal, et al, "Fast Discovery of Association Rules", in Y. Fayyad, et al., editors, Advances in Knowledge Discovery and Data Minining, AAAI Press/The MIT Press, pp. 307-328, 1996.
T. Jaakkola, et al., "Exploiting generative models in discriminative classifiers", in Advances in NIPS 11, 1999.
D.D. Lewis, "Naive (Bayes) at Forty: The Independence Assumption in Information Retrieval", in Machine Learning: ECMLM-98, Tenth European Conference on Machine Learning, pp. 4-15, 1998.
K. Seymore, et al., "Learning Hidden Markov Model Structure for Information Extraction", in Machine Learning for Information Extraction; Papers from the AAAI Workshop, 1999. Tech Rep. WS-99-11, AAAI Press.
U.Y. Nahm, et al., "Text Mining with Information Extraction", in AAAI 2002 Spring Symposium on Mining Answers from Texts and Knowledge Bases, 2002.
A. McCallum and K. Nigam, "A Comparison of Event Models for Naive Bayes Text Classificatin", in Learning for Text Categorization: Papers from the AAAI Workshop, pp. 41-48, 1998, Tech. Rep. WS-98-05, AAAI Press.
R. Ghani, et al., "Data Mining on Symbolic Knowledge Extracted from the Web", in Workshop on Text Mining at the Sixth ACM SIGKDD International Conference on Knowledge Discovery and Data Mining, 2000.
T. Joachims, "Transductive Inference for Text Classificatioon using Support Vector Machines", in Machine Learning: Proceedings of the Sixteenth International Conference, 1999.
K. Nigam, et al., "Text Classification from Labeled and Unlabeled Documents using EM", Machine Learning 39 (2/3): 103-134, 2000.
M. Craven, et al., "Learning to Construct Knowledge Bases from the World Wide Web," Artificial Intelligencen, 118 (1-2) 69-114, 2000.
Hoiem, et al., "Object-Based Image Retrieval Using the Statistical Structure of Images", IEEE Conference on Computer Vision and Pattern Recognition, pp. 1-8, 2004.
DeCoste, et al., "Distortion-Invariant Recognition via Jittered Queries", IEEE, pp. 1-6, 2002.
Zhou, Y., "Democratic Co-Learning", 16th IEEE Conference on Tools with Artificial Intelligence, pp. 1-9, 2004.
Zufiria, et al, "Extended Backpropagation for Invariant Pattern Recognition Neural Networks", International Joint Conference on Neural Networks, pp. 2097-2100, 1993.
Licsar, et al., "User-Adaptive Hand Gesture Recognition System with Interactive Training", Image and Vision Computing 23, pp. 1102-1114, 2005.
Becker, D., "Sensei: A Real-Time Recognition, Feedback and Training System for T'ai Chi Gestures", MIT Media Lab Perceptual Computing Gruop Technical Report No. 426, pp. 1-50, 1997.
Probst, K., R. Ghani, "Towards 'Interactive' Active Learning in Multi-view feature sets for Information Extraction", Lecture Notes in Computer Science, vol. 4701, Sep. 8, 2007, pp. 683-690, XP019071429.
Probst, et al., "Semi-Supervised Learning of Attribute Value Pairs from Product Descriptions" Proceedings of the 20th International Joint Conferences on Artificial Intelligence (IJCAI '07) Jan. 6, 2007-Jan. 12, 2007, pp. 2838-2843, XP007906331.
Probst, et al., "Semi-Supervised Learning to Extract Attribute-Value Pairs from Product Descriptions on the Web", Proceedings of the 2006 Workshop on Web Mining (Webmine '06); 17th European Conference on Machine Learning (ECML '06) & 10th European Conference on Priples and Practice of Knowledge Discovery in Databases (PKDD '06) Sep. 18, 2006, pp. 38-49, XP002504179.
International Search Report and Written Opinion for PCT/GB2008/003188 dated Sep. 12, 2008, Form PCT/ ISA/210.
International Preliminary Report on Patenability under Cahpter I for PCT/GB2008/003118 dated Mar. 25, 2010.
Jones, et al., "Active Learning for Information Extraction with Multiple View Feature Sets", ECML 2003 Workshop on Adaptive Text Extraction and Mining, 2003.
Lewis, David and William Gale, "A Sequential Algorithm for Training Test Classifiers", 1994, Proceedings of Seventeenth Annual International ACM-SIGIR Conference on research and Development in Information Retrieval, Springer-Verlag, London, pp. 3-12.
Lin, Dekang, "Dependency-Based Evaluation of Minipar", Workshop on the Evaluation of Parsing Systems, 1998.
McCallum, Andrew and Kamal Nigan, "Employing EM and Pool-Based Active Learning for Text Classification", Proceedings of ICML, 1998.
Muslean, Ion, et al, "Active+Semi-Supervised Learning = Robust Multi-View Learning", Proceedings of the ICML, 2002.
Thompson, Cynthia et al., "Active Learning for Natural Language Parsing and Information Extraction", ICML, 1999.
Tong, Simon and Daphne Koller, "Support Vector Machine Active Learning with Applications to Text Classification", Journal of Machine Learning Research, 2001.
Finn, Aidan and Nicholas Kushmerick, "Active Learning Selection Strategies for Information Extraction", ECML-03 Workshop on Adaptive Text Extraction and Mining 2003.
Agrawal, et al., "On Integrating Catalogs", ACM, May 2001.
Joachims, "A Probabilistic Analysis of the Rocchio Algorithm with TFIDF for Text Categorization", Carnegie Mellon University, Mar. 1996.
Porter, "An Algorithm for Suffix Stripping", Program, 14, No. 3, pp. 130-137, Jul. 1980.
Songfeng, Xiaofeng, Nanning & Weipu, "Unsupervised Clustering Based Reduced Support Vector Machines", IEEE 2003, pp. 821-824.
Guha, Rastogi & Shim, "A Clustering Algorithm for Categorical Attributes", Elsevier, 2000, pp. 1-24.
Nauman & Haussler, "Declarative Data Merging with Conflict Resolution", IBM 2002, pp. 1-13.
Ghani, "Mining the Web to Add Semantics to Retail Data Mining", Springer, 2004, pp. 43-56.
Ester, Kriegel, Sander and Xu, "A Density-Based Algorithm for Discovering Cluters in Large Spatial Databases with Noise", AAAI, 1996, pp. 226-231.
Blum, Avrim & Tom Mitchell, "Combining Labeled and Unlabeled Data with Co-Training", Proceedings of the 1998 Conference on Computational Learning Theory.
Brill, E., "Transformation-Based Error-Driven Learning and Natural Language Processing: A Case Study in the Part-of-Speech Tagging", Association for Computational Linguistics, 1995.
Collins, M., and Y. Singer, "Unsupervised Models for Named Entity Classification", AT&T Labs—Research.
Schafer, J. Ben et al., "E-Commerce Recommendation Applications", GroupLens Research Project, Department of Computer Science and Engineering, University of Minnesota.
Ghani, R., & R. Jones, "A Comparison of Efficacy and Assumptions of Bootstrapping Algorithms for Training Inforamtion Extraction Systems", Accenture Technology Labs, Chicago IL, School of Computer Science, Carnegie Mellon University, Pittsburg, PA.
Lin, D., "Dependency-Based Evaluation of Minipar", Department of Computer Science, University of Alberta, Edmonton, Alberta, Canada.
Jones, R., "Learning to Extract Entities from Labeled and Unlabeled Text," School of Computer Science, Carnegie Mellon University, May, 2005.
Liu, B., et al., "Opinion Observer: Analyzing and Comparing Opinions on the Web", International World Wide Web Conference Committee (W3C2) WWW2005, May 10-14, 2005, Chiba, Japan.
Nigam, K., and R. Ghani, "Analyzing the Effectiveness and Applicability of Co-Training", School fo Computer Science, Carnegie Mellon University, Pittsburgh PA.
Peng, F., A. McCallum, "Accurate Information Extraction from Research Papers using Conditional Random Fields", Department of Computer Science, University of Massachusetts, Amherst MA.
Popescu A.m., and O. Etzioni, "Extracting Product Features and Opinions from Reviews", Department of Computer Science and Engineering, University of Washington, Seattle, WA.

* cited by examiner

DETERMINATION OF A PROFILE OF AN ENTITY BASED ON PRODUCT DESCRIPTIONS

CROSS-REFERENCE TO RELATED APPLICATION

The instant application is a divisional application of U.S. patent application Ser. No. 10/119,665 entitled "DETERMINATION OF ATTRIBUTES BASED ON PRODUCT DESCRIPTIONS" and filed Apr. 10, 2002, the entirety of which prior application is incorporated herein by this reference.

FIELD OF THE INVENTION

The present invention relates to a technique for gaining better understanding of the meaning of products offered/selected by entities and, in particular, to a technique for determining attributes based on product descriptions.

BACKGROUND OF THE INVENTION

Data Mining techniques are being used with increasing frequency by retailers and manufacturers in an attempt to better understand the nature of their business and customers. That is, in most data mining applications, a large amount of transactional data is analyzed without actually having any idea of what the items in the transactions mean or what they say about the customers who purchased those items. For example, in a retail apparel transaction, a basket (i.e., the items purchased by a given customer at one time) may contain a shirt, a tie and a jacket. When data mining algorithms such as association rules, decision trees, neural networks etc. are applied to this basket, they are unable to comprehend the attributes of these products and what those attributes imply. In fact, these items could just as easily be replaced by distinct symbols, such as A, B and C, and the algorithms would produce the same results.

However, in many domains, attribute information is implicitly available and can be used to improve data mining systems by adding an attribute dimension to the data being analyzed. For example, using current data mining techniques, a clothing retailer would know the price, size, and color of a particular shirt that was purchased. However, that same retailer will not be able tell, using these same techniques, what the shirt says about the customer, e.g., this customer tends toward conservative, classic, business wear rather than flashy, trendy, casual wear. These "softer" attributes that say so much about products and the people who buy them tend not to be available for analysis in a systematic way. In a similar vein, such attributes may not only tell something about the people that buy them, but also about the retailers that sell them and/or the manufacturers that provide them. Indeed, a greater understanding of the attributes of product lines being offered by competitors could be used to better develop strategies and aid in planning Thus, a need exists for a technique whereby such attributes may be more readily obtained and applied. With an understanding of such attributes, a variety of services, including recommendation systems and competitive analysis, may be enabled with greater efficiency and efficacy than currently available.

SUMMARY OF THE INVENTION

The present invention provides a technique for determining attributes of products based on one or more descriptions of those products. In one embodiment, one or more attributes are defined and, for each attribute, a plurality of possible attribute values are also defined. For a given product and attribute, one or more descriptions of the product are obtained and analyzed to determine the correspondence of the description(s) to each of the plurality of possible attribute values. The language found in these descriptions is typically selected to position the product in consumers' minds in a manner that implicitly suggests some values of the defined attributes. In this manner, an understanding of the given product as judged by the defined attributes may be obtained.

In another embodiment, the analysis performed to assess the correspondence between the product description(s) and the possible attribute values is based on a statistical model that is itself developed based on labeled training data. The labeled training data, in turn, is provided by analysis of a sample of industry-specific descriptions across a variety of products according to industry resources, such as industry experts, catalogs, trade magazines, etc.

A knowledge base can be populated with information identifying the products and their correspondence to the plurality of possible attribute values for each attribute. Where the products assessed in this manner correspond to products selected by an entity (e.g., an individual browsing or purchasing via an on-line system), a profile of that entity may be developed indicating that entity's preferences. Based on this profile, appropriate marketing messages specific to the entity may be selected or recommendations for other products having similar attribute profiles may be developed. Significantly, such recommendations may not only pertain to products similar to those selected by the entity, but also to entirely different categories of products. Similarly, profiles of retailers and/or manufacturers may be developed based on the products they offer, thereby fostering competitive analysis. In yet another embodiment, understanding can be developed regarding not just the attributes of the products themselves, but also the type of marketing schemes being employed. By combining an understanding of the products a given entity expresses interest in with an understanding of the marketing schemes used in conjunction with such products, more tailored marketing approaches may be used on a case-by-case basis.

BRIEF DESCRIPTION OF THE DRAWINGS

The features described in this disclosure are set forth with particularity in the appended claims. These features and attendant advantages will become apparent from consideration of the following detailed description, taken in conjunction with the accompanying drawings. One or more embodiments are now described, by way of example only, with reference to the accompanying drawings wherein like reference numerals represent like elements and in which:

DETAILED DESCRIPTION OF THE PRESENT EMBODIMENTS

Figure 1:
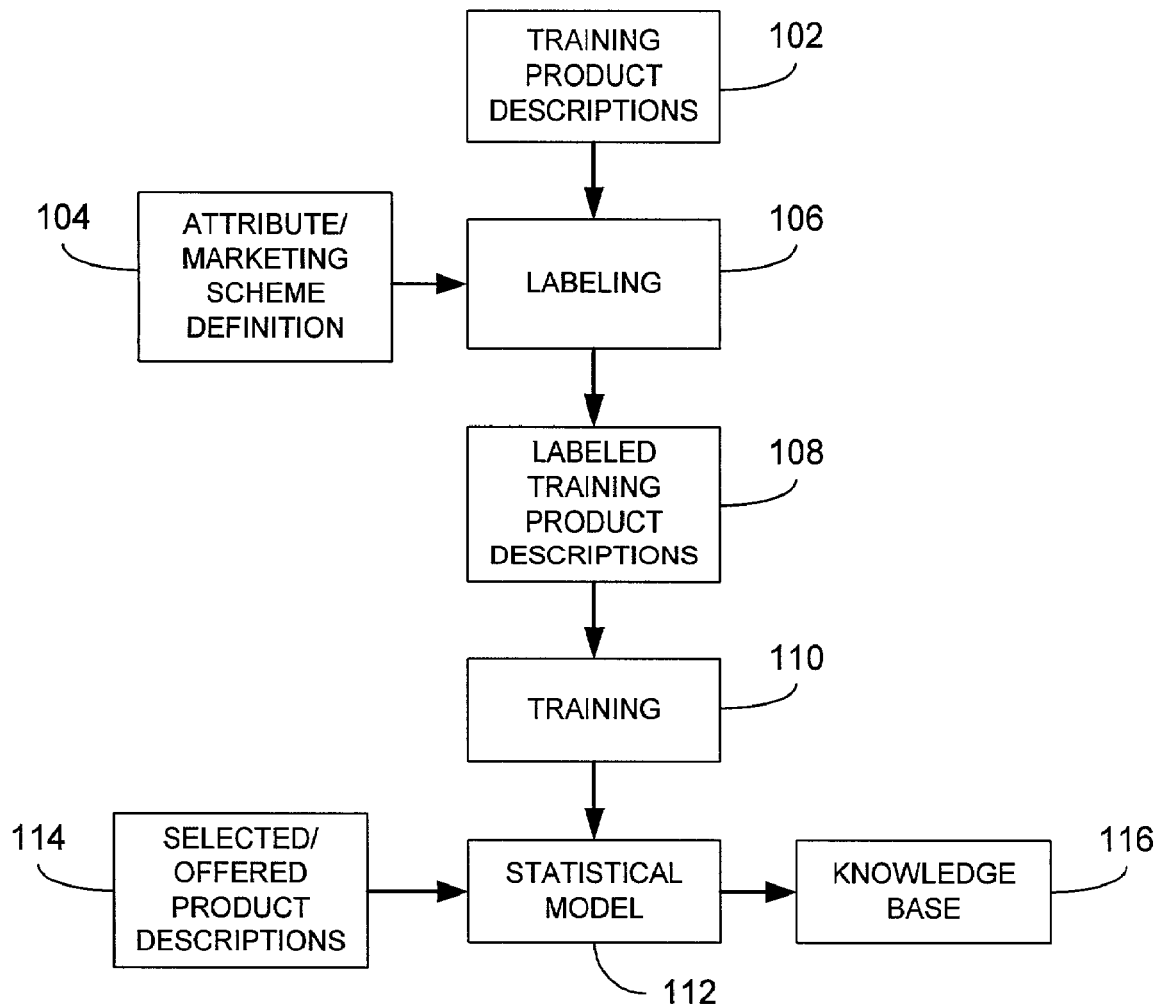
FIG. 1 is a block diagram schematically illustrating processing in accordance with an embodiment of the present invention.

The present invention may be more readily described with reference to FIGS. 1-6. FIG. 1 schematically illustrates processing in accordance with one embodiment of the present invention. In particular, blocks 102-112 illustrate the manner in which a statistical model is developed, and blocks 112-116 illustrate the manner in which the statistical model is used to develop a knowledge base regarding products. In general, separate statistical models should be developed for each category of products under consideration. For example, throughout this specification, various examples relating to the retail apparel industry are presented, including the development of a statistical model specific to the retail apparel industry. However, it is understood that the same techniques described herein could be applied to other categories of products, e.g., furniture, consumer electronics, books, music, etc.

When a particular category of products has been selected, descriptions of various products within the category to be used for training are collected at block 102. The present invention is not limited to any particular format that a given description may take, nor is the present invention limited to any particular method for collecting such descriptions. Descriptions for the purposes of the present invention may comprise any means by which characteristics (both objective and subjective) of a product may be conveyed to an interested party. It is preferred that such descriptions can be obtained in an automated fashion. In one embodiment of the present invention, it is further preferred that the descriptions take the form of text documents or excerpts and, more particularly, text documents that are accessible via a public communication network such as the World Wide Web. Furthermore, such text documents may exist in an unstructured form, as in the case of straight text, or in semi-structured (e.g., tables) or structured (e.g., relational database) form. Such documents may be discovered at various websites residing on servers maintained by a variety of entities such as retailers and manufacturers. For example, written ad copy provided in a retailer's website may be considered a description for the purposes of the present invention.

At block 104, attributes to be used in assessing the various products, as well as the various possible attribute values for each attribute, are selected. The process of selecting such attributes should be performed based on the category of products to be assessed and should be performed in light of particularized knowledge of the category. To this end, a variety of sources may be consulted to determine those attributes having the most meaning in understanding the subjective nature of the products under consideration. For example, industry experts may be consulted in an attempt to define those attributes most commonly considered in the industry. Alternatively, other sources of industry knowledge, such as catalogs, trade magazines, etc. may be used. Further still, polling techniques may be used to determine the type of attributes that consumers themselves consider when assessing various categories of products. An exemplary set of attributes and possible attribute values, particularly applicable to the retail apparel industry, is shown in Table 1:

TABLE 1

| Attribute | Possible Attribute Values | Description |
|---|---|---|
| Age Group | Juniors, Teens, GenX, Mature, All Ages | For what ages is this item most appropriate? |
| Functionality | Loungewear, Sportswear, Eveningwear, Business Casual, Business Formal | How will the item be used? |
| Price Point | Discount, Average, Luxury | Compared to other items of this kind is this item cheap or expensive? |
| Formality | Informal, Somewhat Formal, Very Formal | |
| Conservative | 1 (gray suits) to 5 (loud, flashy clothes) | Does this suggest the person is conservative or ashy? |
| Sportiness | 1 (very sporty) to 5 (not sporty at all) | |
| Trendiness | 1 (timeless classic) to 5 (this season's favorite) | Is this item popular now but likely to go out of style, or is it more timeless? |
| Brand Appeal | 1 (brand makes the product unappealing) to 5 (high brand appeal) | Is the brand known and likely to make it appealing to a sizable group? |

As the entries in Table 1 illustrate, the definition of attributes and their possible attribute values is an exercise in creating objective criteria to capture a range of subjective attributes. As such, it may be necessary to refine the attributes and their possible values as experience demonstrates the worthiness of the attribute definitions, or lack thereof, as judged by the degree of insight provided by the attribute definitions. Note that the possible attribute values may comprise distinct labels chosen to cover recognized perceptions of the attribute (e.g., Loungewear, Sportswear, Eveningwear, Business Casual, Business Formal), or they may be chosen to express varying degrees of affinity with the attribute (e.g., 1=not trendy at all, 5=very trendy). Those having ordinary skill in the art will recognize that the system of values chosen for any given attribute is a matter of design choice, and the present invention is not limited in this regard.

With the attributes and their various possible attribute values defined, labeling of the product descriptions to be used for training occurs at block 106. In a presently preferred embodiment, the various descriptions are presented to experts in the field of marketing the types of products under consideration. The experts are also presented with a description of the attributes and their corresponding possible attribute values. The experts assign a particular attribute value for each attribute to each of the descriptions they have been given. It is anticipated, however, that other types of individuals may be used for this purpose. For example, depending on the application, interested consumers or members of a focus group can be used in place of marketing experts as a matter of design choice.

In practice, the training descriptions are most typically divided into disjoint subsets with each subset labeled by a different expert. However, this requires checks to ensure that the labeling done by each expert is consistent with the other experts. One way to perform such checks would be to swap the subsets for each expert and ask each expert to repeat the process on his/her set. Obviously, this can get very expensive and clearly subverts the very efficiencies gained by distributing disjoint subsets to multiple experts. To address this, association rules may be generated based on the labeled data using the apriori algorithm described by Agrawal et al. in "Fast Discovery of Association Rules", Advances in Knowledge Discovery and Data Mining, p. 307-328 (AAAI Press/The MIT Press 1996), the disclosure of which is incorporated herein by this reference. By using the apriori algorithm, a set of rules can be provided which relate multiple attributes over all products that were labeled. Traditionally, the apriori algorithm has been used to perform basket analysis, i.e., analyze a collection of baskets (transactions) and identify associations among items found in these baskets. By treating each product as a basket and the attributes of that product (as assigned by each expert) as items in the basket, this scenario becomes analogous to traditional market-basket analysis. For example, a product with some unique identification, say a "Polo V-Neck Shirt", which was labeled as Age Group: Teens, Functionality: Loungewear, Price Point: Average, Formality: Informal, Conservative: 3, Sportiness: 4, Trendiness: 4, Brand Appeal: 4 becomes a basket with each attribute value as an item. Table 2 shows some sample rules that were generated on actual labeled descriptions based on execution of the apriori algorithm with both single and two-feature antecedents and consequents.

TABLE 2

| Rule | Support | Confidence |
|---|---|---|
| Informal ← Sportswear | 24.5% | 93.6% |
| Informal ← Loungewear | 16.1% | 82.3% |
| Informal ← Juniors | 12.1% | 89.4% |
| Price Point = Average ← Brand Appeal = 2 | 8.8% | 79.0% |
| Brand Appeal = 5 ← Trendiness = 5 | 16.3% | 91.2% |
| Sportswear ← Sportiness = 4 | 9.0% | 85.7% |
| Age Group = Mature ← Trendiness = 1 | 9.4% | 78.8% |

In Table 2, the "←" symbol illustrates an association rule, e.g., items categorized as "Informal" are also categorized as "Sportswear" and "Loungewear". More generally, the notation "A←B with support S and confidence C" means that S % of the transactions (baskets) contain item A and C % of those S % have both A and B. As Table 2 illustrates, the association rules match one's general intuition, e.g., apparel items labeled as informal were also labeled as sportswear and loungewear. Items with average prices did not have high brand appeal, reflecting the possibility that items with high brand appeal are usually more expensive. Also, trendy clothes often have a very high brand appeal, which is often the case in the apparel industry. Interestingly, items that were labeled as "Mature" were also labeled as being not at all trendy. Although the example illustrated in Table 2 is illustrative only, it demonstrates the manner in which association rules can be used to verify the consistency of the labeling process.

The output of the labeling process 106, preferably verified as described above, is labeled training product descriptions 108 that may be stored in a digital storage medium. Thereafter, training of statistical models is performed at block 110. In one embodiment of the present invention, the process of training models to learn the attributes associated with each of the products extracted from the retailers websites is treated as a traditional text classification problem where one text classifier is created for each attribute. For example, in the case of the Age Group attribute, a product is classified into one of five classes or possible attribute value (e.g., Juniors, Teens, GenX, Mature, All Ages). One algorithm that may be used for this purpose is the so-called naive Bayes algorithm, a brief description of which is given below. Further information regarding the naïve Bayes algorithm can be found in Lewis, "Naive (Bayes) at forty: The independence assumption in information retrieval", Machine Learning: ECML-98, Tenth European Conference on Machine Learning, p. 4-15 (1998) and McCallum et al., "A comparison of event models for naive Bayes text classification", Learning for Text Categorization: Papers from the AAAI Workshop, p. 41-48 (AAAI Press 1998), the disclosure of which articles are incorporated herein by this reference.

Naive Bayes is a simple but effective text classification algorithm for learning from labeled data. The parameterization given by naive Bayes defines an underlying generative model assumed by the classifier. In this model, a class is first selected according to class prior probabilities. Then, the generator creates each word in a document by drawing from a multinomial distribution over words specific to the class. Thus, this model assumes each word in a document is generated independently of the others given the class. Naive Bayes forms maximum a posteriori estimates for the class-conditional probabilities for each word in the vocabulary V from labeled training data D. This is done by counting the frequency that word $w_t$ occurs in all word occurrences for documents $d_i$ in class $c_j$, supplemented with Laplace smoothing to avoid probabilities of zero, as described by Equation 1:

$$P(w_t \mid c_j) = \frac{1 + \sum_{i=1}^{|D|} N(w_t, d_i) P(c_j \mid d_i)}{|V| + \sum_{s=1}^{|V|} \sum_{i=1}^{|D|} N(w_s, d_i) P(c_j \mid d_i)} \quad \text{(Eq. 1)}$$

where $N(w_t, d_i)$ is the count of the number of times word $w_t$ occurs in document $d_i$, and where $P(c_j \mid d_i) \in \{0,1\}$ as given by the class label. The result of Equation 1, the a posteriori probability estimate $P(w_t \mid c_j)$, expresses the probability that a word, $w_t$, will occur given a particular class (attribute), $c_j$, which probabilities are stored and form the basis of the statistical model 112. Note that well known techniques may be used to eliminate from each description words that provide little informational value (e.g., "the", "a", "to", etc.) thereby minimizing the amount of required storage. In essence, then, the statistical model 112 comprises a set of probabilities expressing the likelihood that a given word will occur for a given attribute. Table 3 provides an exemplary list of words having high weights for the attribute values shown as determined by the naive bayes classifier. Note that the words in Table 3 were selected by scoring all the words according to their weighted log-odds-ratio scores and picking the top 10 words. A weighted log-odds-ratio score may be calculated according to Equation 2 below:

$$\text{Weighted Log-Odds-Ratio Score for word } w = \quad \text{(Eq. 2)}$$

$$P(w \mid positiveclass) *$$

$$\text{Log}\left(\frac{P(w \mid positiveclass)}{P(w \mid negativeclass)} * \frac{1 - P(W \mid negativeclass)}{1 - P(W \mid positiveclass)}\right)$$

TABLE 3

| Attribute/Attribute Value | Word |
|---|---|
| Brand Appeal = 5 (high) | lauren, ralph, dkny, Kenneth, cole, imported |
| Conservative = 5 (high) | lauren, ralph, breasted, seasonless, trouser, jones, sport, classic, blazer |
| Conservative = 1 (low) | rose, special, leopard, chemise, straps, flirty, spray, silk, platform |
| Formality = Informal | jean, tommy, jeans, denim, sweater, pocket, neck, tee, hilfiger |
| Formality = Somewhat Formal | jacket, fully, button, skirt, lines, york, seam, crepe, leather |

TABLE 3-continued

| Attribute/Attribute Value | Word |
| --- | --- |
| Age Group = Juniors | jrs, dkny, jeans, tee, collegiate, logo, tommy, polo, short, sneaker |
| Functionality = Loungewear | chemise, silk, kimono, calvin, klein, august, lounge, hilfiger, robe, gown |
| Functionality = Partywear | rock, dress, sateen, length:, skirt, shirtdress, open, platform, plaid, flower |
| Sportiness = 5 (high) | sneaker, camp, base, rubber, sole, white, miraclesuit, athletic, nylon, mesh |
| Trendiness = 1 (low) | lauren, seasonless, breasted, trouser, pocket, carefree, ralph, blazer, button |

As described above, naïve Bayes may be used to develop the statistical model in an automated fashion. However, such statistical models can be augmented through the use of "manually" coded rules. For example, such a rule may state, in essence, "if the word 'jeans' appears in the description, then the item is Informal." As another example, such a rule may state, "if 'Jrs.' appears in the title of a description, then the Age Group is Juniors." Such rules, in effect, reduce the probabilities described above into certainties, i.e., the occurrence of a given word is always associated with a given attribute value.

Furthermore, the quality of the statistical models described above depend in part upon the quantity of labeled training data used to generate them. That is, greater amounts of labeled training data typically result in more accurate statistical models. In general, however, the acquisition of unlabeled training data is far less expensive than providing labeled training data, i.e., through the use of experts manually labeling data. However, various techniques are known to exist whereby statistical models based upon labeled training data may be augmented or improved through the use of unlabeled training data. Such techniques include the so-called Expectation-Maximization (EM) technique, which has been used to estimate maximum a posteriori parameters of a generative model. These results have shown that using unlabeled data can significantly decrease classification error, especially when labeled training data is sparse. As more fully described in Dempster et al., "Maximum likelihood from incomplete data via the EM algorithm", Journal of the Royal Statistical Society, Series B, 39(1):1-38 (1977), EM is an iterative statistical technique for maximum likelihood estimation in problems with incomplete data. That is, given a model of data generation, and data with some missing values, EM will locally maximize the likelihood of the parameters and give estimates for the missing values. The naive Bayes generative model allows for the application of EM for parameter estimation. As applied to the instant invention, the attribute values of the unlabeled data are treated as the missing values. In implementation, EM is an iterative two-step process. Initial parameter (attribute value) estimates are set using standard naive Bayes from just the labeled documents. Thereafter, the expectation and maximization steps are iterated. The expectation step calculates probabilistically-weighted class (attribute) labels, $P(c_j|d_i)$, for every unlabeled document. The maximization step estimates new classifier parameters (attribute values) using all the documents, where $P(c_j|d_i)$ is now continuous, as given by the expectation step. Thereafter, the expectation and maximization steps are repeated until the classifier converges. In this manner, the statistical model 112 can be improved without incurring the expense of expert reviews of additional training data.

Based on the statistical model 112 (and, possibly, manually coded rules) thus developed, it is possible to thereafter analyze descriptions of products 114 (not otherwise used in the training phase) to determine correspondence of the descriptions to the various possible attribute values. As used herein, the term correspondence signifies a probability that a description of a product (and, consequently, the product itself) is associated with the attribute value. For example, a statistical model may determine that correspondence of a given garment with the various possible attribute values for the "Functionality" attribute defined above are: Loungewear 10%, Sportswear 5%, Eveningwear 50%, Business Casual 15%, Business Formal 20%. That is, there is a 50% chance that the garment, as judged by at least one description of that garment when analyzed according to the statistical model 112, would be perceived as Eveningwear, but only a 5% chance that the garment would be perceived as Sportswear. Such insight into the "meaning" of a product has heretofore been unavailable using traditional data mining techniques.

Using the statistical model described above, i.e., probabilities of word occurrences given specific attribute values, the correspondence of descriptions to the various attribute values (classes) may be obtained using Baye's rule:

$$P(c_j|d_i) \propto P(c_j)P(d_i|c_j) \quad \text{(Eq. 3)}$$

Using the assumption from the naïve bayes algorithm that words in descriptions occur independently of each other, Equation 3 becomes:

$$P(c_j | d_i) = P(c_j) \prod_{k=1}^{|d_i|} P(w_{d_{i,k}} | c_j) \quad \text{(Eq. 4)}$$

where $P(w_{d_{i,k}}|c_j)$ are the probabilities of word occurrences given specific attribute values forming the statistical model 112. In effect, Equation 4 provides that the probability that a given description will be perceived in accordance with an attribute is equal to the probability of that attribute multiplied by the product of the probabilities of word occurrences for that attribute across all relevant words in the description. Note that Equation 4 is defined in terms of a single description. However, those having ordinary skill in the art will recognize that multiple descriptions for a single product could be used (i.e., $1 \leq i \leq j$ where $j \geq 2$) and the resulting probabilities combined (e.g., averaged) to arrive at an overall probability given the multiple descriptions.

The product descriptions 114 analyzed in this manner may be based on particular products for which an entity (e.g., an individual, an organization, etc.) has expressed interest in, for example, by selecting the product via a website to purchase the product or to receive additional information about the product. Alternatively, the products 114 may correspond to products that a given entity (e.g., a retailer, a manufacturer, etc.; basically any party that would be concerned with the attribute-based perception of the product) is currently offering. Based on the correspondences determined in this manner, it can be inferred that the products associated with the description(s) will be perceived in the same manner. Thus, identifications of the products and the resulting correspondence determinations may be stored in a knowledge base 116 for later use. The knowledge base 116 may comprise any suitable data base implementation. A hardware embodiment suitable for implementing the present invention is further described with reference to FIGS. 2 and 3.

Figure 2:
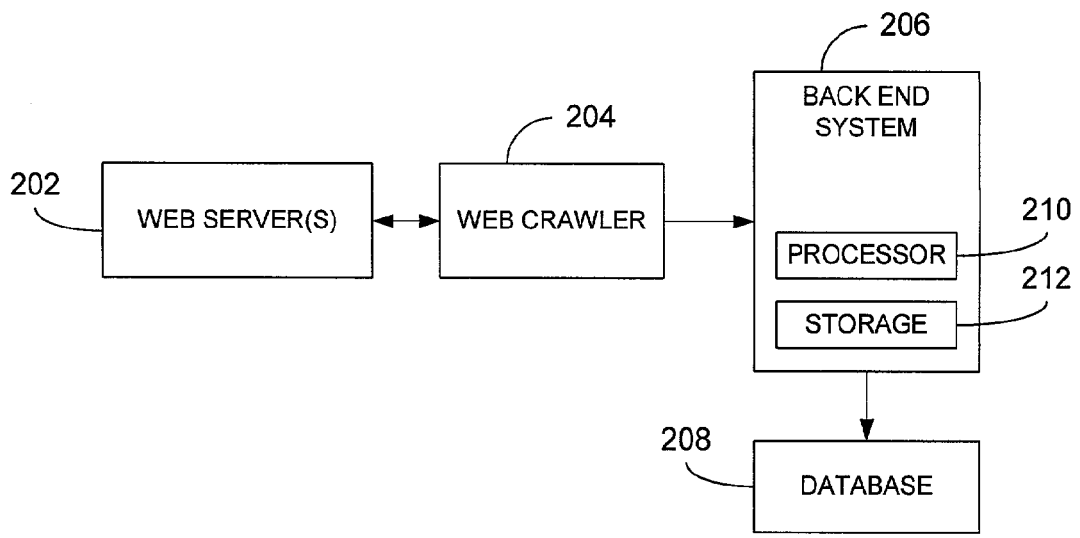
FIG. 2 is a block diagram illustrating a system that may be used in conjunction with an embodiment of the present invention.

FIG. 2 illustrates a computer-based architecture that may be used to implement various aspects of the present invention. In particular, a back end system 206 is coupled to a database 208. As shown, the back end system 206 comprises at least one processor 210 (such as a microprocessor, microcontroller, digital signal processor, etc. or combinations thereof) coupled to a storage device 212 (such as random-access memory, read-only memory, optical storage devices, etc.) having stored thereon executable instructions that may be executed by the at least one processor. In particular, the back end system 206 (in the configuration shown in FIG. 2) may be used to implement, in whole or in part, the processing described above relative to blocks 102-112 using known programming techniques.

In a preferred embodiment, the descriptions of products are available via a public communications network such as the World Wide Web in the form of textual content in web pages. Such content resides on one or more web servers 202 coupled to the back end 206 using conventional techniques. When gathering training product descriptions, a so-called web crawler 204 (i.e., a program that visits remote sites and automatically downloads their contents) programmed to visit websites of relevant retail stores and extract names, Uniform Resource Locators (URLs), descriptions, prices and categories of all products available, may be used. Such a web crawler is preferably implemented using computer-programming techniques and may be programmed to automatically extract information or, in a simpler implementation, manually configured to extract specific information. As the web crawler collects suitable information (descriptions), they are stored in the database 208, which may comprise a suitable configured server computer. Likewise, as the knowledge base 116 is developed, it may be stored in the database 208 for later reference.

Figure 3:
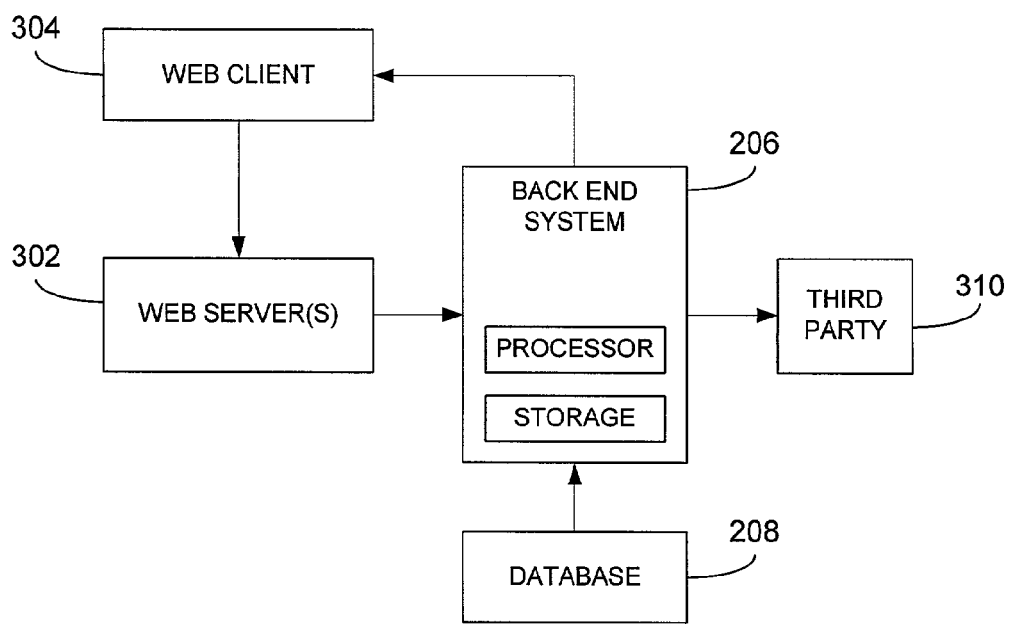
FIG. 3 is a block diagram illustrating a system that may be used in conjunction with another embodiment of the present invention.

Referring now to FIG. 3, another system is shown in which the back end system 206 and database 208 are used to analyze selected/offered products. In particular, the back end system 206 is coupled, preferably via a public communications network such as the World Wide Web, to a web client 304 and/or one or more web servers 302. In general, the descriptions of the products to be analyzed 114 may be derived from either or both of two sources: products that are selected by an entity or products that are offered by an entity. For purposes of the present invention, the act of "selecting" a product includes any manifestation of interest by the entity in the product, e.g., on-line browsing, putting a product in a shopping cart, asking for info, etc. In a currently preferred embodiment, the web client allows an entity (such as an individual, organization or any uniquely identifiable party) to request and obtain information from, or submit information to, the one or more web servers 304. To the extent that such requested/submitted information manifest an entity's interest in one or more products, they may be regarded as selected products. The back end system 206 may directly monitor the activity of the web client 304 or may be provided with the relevant information through the web server(s) 302 or other sources.

The other source of product descriptions corresponds to products that are offered by selected entities, e.g., retailers, manufacturers, etc. Once again, such descriptions are preferably provided through web sites and web pages maintained by such retailers, etc. In this case, the back end system 206 may directly access the relevant web sites to obtain the new descriptions. It should be noted that, although web-based sources of descriptions are presently preferred, the present invention is not necessarily limited in this regard. In fact, suitable product descriptions may come from virtually any source provided that the descriptions may be reduced to a format whereby the back end system 206 is able to analyze them, e.g., manually entered into a computer, scanned and automatically recognized, etc.

Regardless of the source of the descriptions, the back end system 206 may perform the processing described above to determine the correspondences of the various possible attribute values to the described products. The resulting attribute determinations may then be stored in the database 208 as part of a larger knowledge base, or may be provided to the web client 304, the web server(s) 302 or to a third party 310. For example, an individual browsing a retailer's web site may wish to see how his or her selections are perceived in terms of the defined attributes. Conversely, a retailer implementing a web site on the web server(s) 302 may wish to understand how its product offerings are perceived. Further still, one retailer (e.g., a third party 310) may want to know the attributes of a competitor's product line. Such applications of the present invention are further described with reference to FIGS. 4-6.

Figure 4:
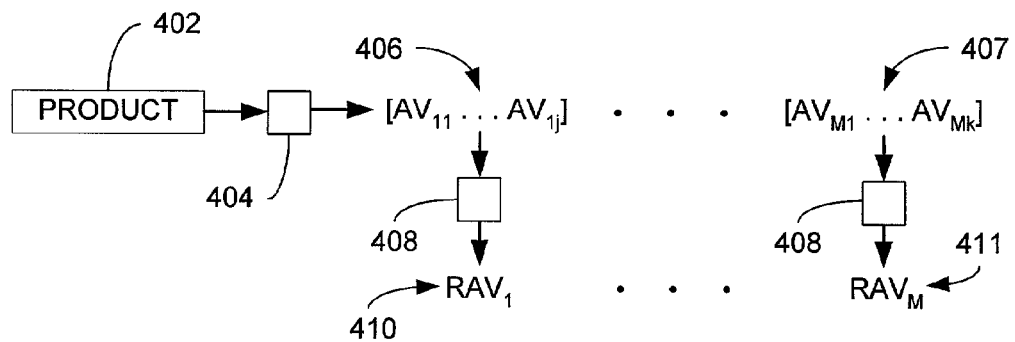
FIG. 4 is a schematic illustration of determination of attributes for a product in accordance with an embodiment of the present invention.

Referring now to FIG. 4, a schematic illustration of determination of attributes for a product is provided. In particular, one or more descriptions of a product 402 are analyzed 404 based on a statistical model (as described previously) to derive various sets 406-407 of correspondences of possible attribute values. In FIG. 4, the symbols $AV_{xy}$ represent the determined correspondences of product description(s) to the different possible attribute values for M different attributes, where x is the attribute index and y is the possible attribute value index for that attribute. Note that the range of the attribute value index, y, may vary from attribute to attribute, as represented by the indices j and k.

Each correspondence is preferably expressed as a percentage or likelihood that the description of the product will be perceived in accordance with the given attribute value. Thus, the various sets of correspondences 406-407 can be treated like a variable vector, as discussed further with reference to FIG. 6. Additionally, each set 406-407 may be further processed 408 to select one attribute value correspondence 410-411 that is representative of the attribute for that product. For example, for each attribute, that attribute value having the greatest correspondence may be selected as the representative attribute value (RAV) correspondence. Those having ordinary skill in the art will appreciate that other methods of selected representative values may be employed. In this manner, the attributes for a given product may be represented more compactly.

As mentioned above, the present invention provides for the establishment of an entity profile based on the products selected by an entity (as in the case, for example, of an individual browsing or purchasing on-line) or based on the products offered by an entity (as in the case, for example, of a retailer). This is further illustrated with respect to FIG. 5. In particular, one or more product descriptions for each of a plurality of products 502-504 are analyzed 506 based on the relevant statistical model, as previously described. The resulting sets of correspondences 508-509 are thereafter available (for example, by virtue of storage in a knowledge base) for further analysis. Note that, in FIGS. 5 and 6, the notation used to represent the determined correspondences is extended to $AV_{xy}(z)$ where z is the product index for the plurality (N) of different products being analyzed.

In order to generate a profile of an entity based on the entity's selected/offered products, the sets of correspondences 508-509 are further analyzed 510 to arrive at representative sets of correspondences 512-513 for each of the M different attributes across the N different products analyzed. Each representative correspondence (indicated as $RAV_{xy}$ in FIG. 5) is based on a combination of, or selection from, comparable attribute value correspondences. For example, the comparable attribute value correspondences of j'th possible attribute value of the first attribute, $AV_{1j}(z)$ for z=1 to N, may be combined or otherwise processed to arrive at a representative correspondence, RAV1j. The particular technique used to produce the representative correspondences is a matter of design choice. For example, a straight average of the comparable correspondences could be calculated. Alternatively, outlier values could be first discarded and an average on the remaining values thereafter calculated. Further still, a median correspondence could be selected. Regardless, the sets of representative correspondences 512-513 may be provided as the profile 514 of the entity.

Alternatively, the sets of representative correspondences 512-513 can be processed further 516 to select only one representative attribute value correspondence 518-519 for each attribute value. The one representative correspondence value 518-519 may be selected in a manner similar to that described above relative to FIG. 4 (block 408), and thereafter provided as part of the profile 520 of the entity.

Regardless of the particular form used to embody the profile 514, 520, the profile may be used in a variety of ways. For example, where the entity is an individual, the profile 514, 520 may indicate that individual's preference for certain types of products as judged by their collective attribute values. In response, a targeted message based on the profile 514, 520 can be generated 522, which message is specifically tailored to appeal to the individual based on his/her determined preferences. In one embodiment, up to n different messages are stored for each product based on n different profile possibilities. Thereafter, depending on the affinity of the customer to the type of message as based by his/her profile, an appropriate message is selected which best corresponds to that profile.

In another embodiment, the profile 514, 520 may be compared 524 with other profiles 526. For example, the profiles of different stores determined over a particular time period may be compared and correlated with other performance metrics, e.g., profitability. Further still, profiles of a single entity, each profile determined over a different time period, may be compared with each other. Those having ordinary skill in the art will recognize that profiles in accordance with the present invention will enable still further types of comparison as a matter of design choice.

The techniques described above relative to FIGS. 4 and 5 are based on the assumption that various selected/offered products are being analyzed relative to attributes that are meaningful for those products, e.g., looking at apparel products for "Trendiness", "Brand Appeal", etc. However, the present invention may be equally applied to infer not only attributes of the products themselves, but also attributes of the marketing campaigns used to sell or otherwise market those products. In this case, the attributes are not selected to provide insight into the products analyzed, but rather to provide insight into the marketing campaign used. For example, Table 4 illustrates exemplary attribute values corresponding to an "Appeal Type" attribute designed for use in analyzing marketing campaigns, and exemplary descriptions that may be categorized accordingly.

TABLE 4

| Attribute Value | Description |
| --- | --- |
| Luxury Indulgence | "Tailored to the standards of the most exclusive spas in the world, the Charter Club Hotel Collection is the ultimate in heavenly bath luxury. Thick and thirsty in heavyweight herringbone and pebble texture." |
| Functional | "Prevent slipping and cold feet with these Charter Club "Cotton Twist" Bath Rugs. |

TABLE 4-continued

| Attribute Value | Description |
| --- | --- |
| | Choose from an assortment of colors. These rugs are made of 100% cotton twist with non-skid backing." |
| Status | "From a collection of exquisite designer looks for the bath, each solid color shower towel sports the signature Ralph Lauren Polo player." |
| Quality/Performance | "Available in a range of vibrant colors to coordinate with any decor, these thirsty towels are designed in luxurious 100% soft Supima ® cotton with an incredible 720 ringspun terry loops per square inch and finished with lock-stitched hems for extra-strength." |

Figure 5:
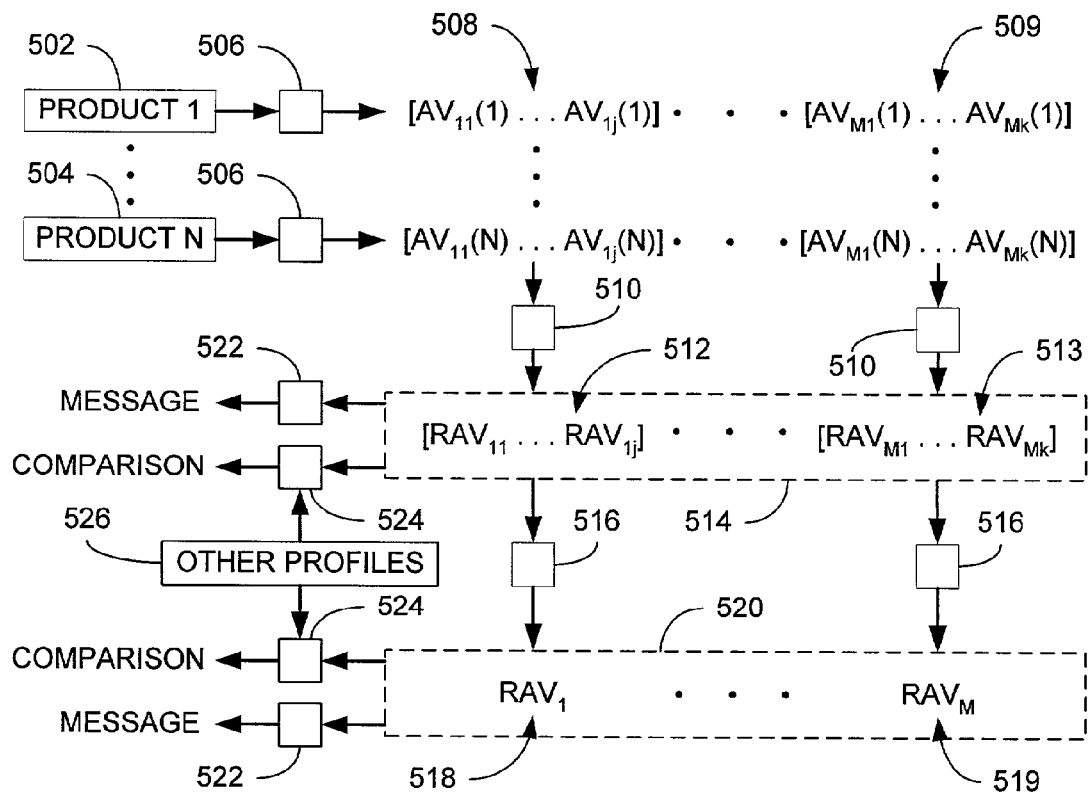
FIG. 5 is a schematic illustration of determination of a profile of an entity and uses thereof in accordance with an embodiment of the present invention.

Thus, in the context of FIGS. 4 and 5, the use of marketing-based attributes allows profiles to be created that provide insight into the what types of marketing campaigns a particular individual responds to or what type of marketing campaign a given retailer/manufacturer is employing, which profiles may be used, as before, to generate additional messages to entities or for comparison purposes.

Figure 6:
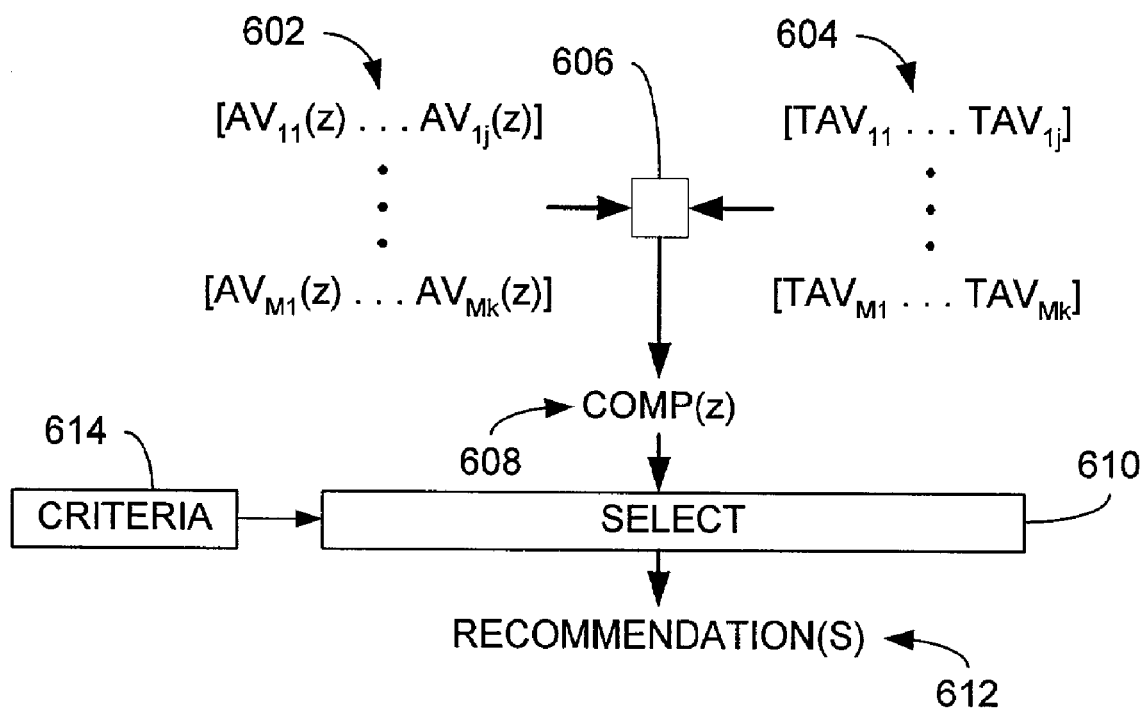
FIG. 6 is a schematic illustration of determination of recommendations in accordance with an embodiment of the present invention.

Referring now to FIG. 6, a technique for generating recommendations in accordance with an embodiment of the present invention is illustrated. Generally, recommender systems provide personalized suggestions based on a history of an individual's likes and dislikes. Many on-line stores provide recommending services e.g. Amazon, CD-NOW, BarnesAndNoble, IMDb, etc. Currently, there are two prevalent approaches to building recommender systems: collaborative filtering and content-based. Collaborative filtering systems work by collecting user feedback in the form of ratings for items in a given domain and exploit similarities and differences among profiles of several users to recommend an item. Such systems recommend other items bought by people who also bought the current item of interest and completely ignores "what" the current item of interest was. Collaborative filtering approaches suffer from two main problems: the "sparsity" problem that most customers do not browse or buy most products in a store and the "New Item" problem that a new product cannot be recommended to any customer until it has been browsed by a large enough number of customers. On the other hand, content-based methods provide recommendations by comparing representations of content contained in an item to representations of content that interests the user. A main criticism of content-based recommendation systems is that the recommendations provided are not very diverse. Since content-based systems are powered solely by the user's preferences and the descriptions of the items browsed, such systems tends to recommend items too similar to the previous items of interest.

In contrast, the recommender technique illustrated in FIG. 6 substantially overcomes many of these limitations. For each of a plurality of products, indexed by variable z, a set of attribute values 602 is compared with a target set of attribute values 604. In practice, this could be done using vector comparison techniques. That is, each set of attribute values 602, 604 is treated as a multidimensional vector and compared using conventional correlation techniques. Those having ordinary skill in the art will recognize that other comparison techniques may be equally employed.

It is further understood that the target set of attribute values 604 may be provided from any of a number of sources. For example, the target set may be equivalent to a given individual's profile as described above relative to FIG. 5. Alternatively, the target set may be based on attributes specifically selected by an entity. For example, an individual could directly specify the desired attribute values (through the use, for example, of a web page via a web client) he/she wishes to obtain recommendations on without having previously established a profile.

Regardless, the resulting comparison 608 indicates the degree of similarity between the target set 604 and the set of attribute values 602 currently under consideration. Thereafter, the comparison result 608 may be provided to a selector 610. The selector 610 selects for recommendation only those products having corresponding comparison results 608 that meet some criteria 614. For example, a simple thresholding process could be used for this purpose. That is, for example, only comparison results 608 showing a correlation of greater than 70% would be accepted for recommendation purposes. Note that the criteria 614 could be predetermined and fixed, or could be user-configurable (again, for example, through the use of a web page via a web client) as desired. Regardless, any products meeting the criteria 614 are thereafter provided as recommendations 612. In a presently preferred embodiment, the recommendations are provided to a web client using known techniques.

The recommendation technique of the present invention improves on collaborative filtering as it would work for new products which users haven't browsed or purchased yet, and can also present the user with explanations as to why they were recommended certain products (in terms of the attributes). Additionally, although content-based systems also use the words in the descriptions of the items, they traditionally use those words to learn one scoring function. For example, a classical content-based recommendation engine takes the text from the descriptions of all the items that a user has browsed or bought and learns a model (usually a binary target function: "recommend" or "not recommend"). In contrast, the system of the present invention effectively changes the feature space from words (thousands of features) to a relatively small number of attributes. In this manner, the present invention can recommend a wide variety of products unlike most content-based systems. Additionally, unlike some prior art recommendation systems, the present invention can be used to recommend products across different product categories. That is, a target set of attribute values, regardless of their source, can be compared with any product so long as that product has available a comparable set of attribute values. As a result, for example, a profile of a given individual could be developed while that individual was browsing through apparel items, but that same profile could be used thereafter to recommend other products (e.g., consumer electronics, furniture, etc.) from entirely different categories but possessing similar attributes.

The present invention provides a technique for determining "soft" attributes of products based on descriptions of such products. Previously, such attributes were not systematically determinable or available. As a result, the present invention enables improved applications based on such attribute insight, for example, profiling entities and/or providing enhanced recommendation services.

While particular preferred embodiments have been shown and described, those skilled in the art will appreciate that changes and modifications may be made without departing from the instant teachings. It is therefore contemplated that any and all modifications, variations or equivalents of the above-described teachings fall within the scope of the basic underlying principles disclosed above and claimed herein.

What is claimed is:

1. A method of establishing a profile of an entity based on a plurality of products associated with the entity, the method comprising:
    for each of the plurality of products:
        for each of a plurality of attributes associated with each of the plurality of products:
            determining, using a first analyzer implemented by at least one computer and based on at least one product description of the product, an attribute probability set for the attribute according to a probability that each of a plurality of attribute values corresponding to the attribute is representative of the product based on the product description,
    thereby providing a plurality of attribute value probability sets, the plurality of attribute value probability sets corresponding to the plurality of attributes associated with each product of the plurality of products;
    determining, by a second analyzer implemented by the at least one computer and operatively connected to the first analyzer, those attribute value probabilities across the plurality of attribute value probability sets that are comparable to each other to provide a plurality of comparable attribute value probabilities;
    determining, by the second analyzer, attribute value probabilities that are representative of each of the plurality of comparable attribute value probabilities to provide representative attribute value probability sets; and
    providing, by the second analyzer, the profile of the entity based on the representative attribute value probability sets.

2. The method of claim 1, further comprising:
    identifying the plurality of products based on product selections by the entity.

3. The method of claim 2, wherein identifying the plurality of products based on product selections further comprises:
    receiving, by the computer from the entity via a communication network, information identifying products indicated in at least one purchase request by the entity.

4. The method of claim 2, wherein identifying the plurality of products based on product selections further comprises:
    receiving, by the computer from the entity via a communication network, information identifying products indicated in at least one request for information by the entity.

5. The method of claim 2, further comprising:
    determining, by a message generator implemented by the at least one computer, an appropriate type of message to provide to the entity based on the profile of the entity; and
    providing, by the message generator, a message of the appropriate type to the entity.

6. The method of claim 1, further comprising:
    identifying the plurality of products based on product offerings of the entity.

7. The method of 6, wherein the at least one description for each product comprises marketing information, corresponding to the product offerings, provided by the entity.

8. The method of claim 7, wherein the marketing information is available via a web page.

9. The method of claim 6, further comprising:
    determining at least one product offered by another entity;
    for each product of the at least one product offered by the other entity, determining, by the first analyzer, correspondence of at least one attribute value to the product based on at least one description of the product to provide a plurality of other attribute value probability sets;

determining, by the second analyzer, comparable attribute value probabilities from each of the plurality of other attribute value probability sets to determine attribute value probabilities that are representative of the comparable attribute value probabilities from each of the plurality of other attribute value probability sets;

providing, by the second analyzer as a profile of the other entity, the attribute value probabilities that are representative of the comparable attribute value probabilities from each of the plurality of other attribute value probability sets; and comparing, by a comparator operatively coupled to the second analyzer, the profile of the entity and the profile of the other entity.

10. An apparatus for establishing a profile of an entity based on a plurality of products associated with the entity, comprising:

at least one processor;

a storage medium, coupled to the at least one processor, having stored thereon instructions that, when executed by the at least one processor, cause the at least one processor to:

for each of the plurality of products:
for each of a plurality of attributes associated with each of the plurality of products:
determine based on at least one description of the product an attribute probability set for the attribute according to a probability that each of a plurality of attribute values corresponding to the attribute is representative of the product based on the product description, thereby providing a plurality of attribute value probability sets, the plurality of attribute value probability sets corresponding to the plurality of attributes associated with each product of the plurality of products;

determine those attribute value probabilities across the plurality of attribute value probability sets that are comparable to each other to provide a plurality of comparable attribute value probabilities;

determine attribute value probabilities that are representative of each of the plurality of comparable attribute value probabilities to provide representative attribute value probability sets; and provide the profile of the entity based on the representative attribute value probability sets.

11. The apparatus of claim 10, wherein the storage medium further comprises instructions that, when executed by the at least one processor, cause the at least one processor to:
identify the plurality of products based on product selections by the entity.

12. The apparatus of claim 11, wherein those instructions that, when executed by the at least one processor, cause the at least one processor to identify the plurality of products based on product selections further are further operative to cause the at least one processor to:
receive, from the entity via a communication network, information identifying products indicated in at least one purchase request by the entity.

13. The apparatus of claim 11, wherein those instructions that, when executed by the at least one processor, cause the at least one processor to identify the plurality of products based on product selections further are further operative to cause the at least one processor to:
receive, from the entity via a communication network, information identifying products indicated in at least one request for information by the entity.

14. The apparatus of claim 11, wherein the storage medium further comprises instructions that, when executed by the at least one processor, cause the at least one processor to:
determine an appropriate type of message to provide to the entity based on the profile of the entity; and
provide a message of the appropriate type to the entity.

15. The apparatus of claim 10, wherein the storage medium further comprises instructions that, when executed by the at least one processor, cause the at least one processor to:
identify the plurality of products based on product offerings of the entity.

16. The apparatus of claim 15, wherein the at least one description for each product comprises marketing information, corresponding to the product offerings, provided by the entity.

17. The apparatus of claim 16, wherein the marketing information is available via a web page.

18. The apparatus of claim 15, wherein the storage medium further comprises instructions that, when executed by the at least one processor, cause the at least one processor to:
determine at least one product offered by another entity;
for each product of the at least one product offered by the other entity, determine correspondence of at least one attribute value to the product based on at least one description of the product to provide a plurality of other attribute value probability sets;
determine comparable attribute value probabilities from each of the plurality of other attribute value probability sets to determine attribute value probabilities that are representative of the comparable attribute value probabilities from each of the plurality of other attribute value probability sets;
provide the attribute value probabilities that are representative of the comparable attribute value probabilities from each of the plurality of other attribute value probability sets; and
compare the profile of the entity and the profile of the other entity.

19. The method of claim 1, wherein determining comparable attribute value probabilities to determine attribute value probabilities that are representative of the comparable attribute value probabilities further comprises at least one of:
averaging the comparable attribute value probabilities;
discarding outliers of the comparable attribute value probabilities and averaging remaining ones of the comparable attribute value probabilities; and
selecting a median of the comparable attribute value probabilities.

20. The apparatus of claim 10, wherein those instructions that cause the at least one processor to determine comparable attribute value probabilities to determine attribute value probabilities that are representative of the comparable attribute value probabilities are further operative to cause the at least one processor to:
average the comparable attribute value probabilities;
discard outliers of the comparable attribute value probabilities and average remaining ones of the comparable attribute value probabilities; and
select a median of the comparable attribute value probabilities.

* * * * *